United States Patent
Van Nieuwenhuyze et al.

(10) Patent No.: US 12,323,789 B2
(45) Date of Patent: Jun. 3, 2025

(54) SECURE ELEMENT AND METHOD FOR MANAGING MESSAGE COMMUNICATION PROTOCOLS

(71) Applicants: STMicroelectronics (Rousset) SAS, Rousset (FR); STMicroelectronics Belgium, Diegem (BE)

(72) Inventors: Olivier Van Nieuwenhuyze, Wezembeek-Oppem (BE); Alexandre Charles, Auriol (FR)

(73) Assignees: STMicroelectronics (ROUSSET) SAS, Rousset (FR); STMicroelectronics Belgium, Diegem (BE)

( * ) Notice: Subject to any disclaimer, the term of this patent is extended or adjusted under 35 U.S.C. 154(b) by 0 days.

(21) Appl. No.: 17/484,246

(22) Filed: Sep. 24, 2021

(65) Prior Publication Data
US 2022/0129568 A1    Apr. 28, 2022

(30) Foreign Application Priority Data
Oct. 27, 2020 (FR) ...................................... 2010973

(51) Int. Cl.
*G06F 21/60*    (2013.01)
*H04L 69/08*    (2022.01)

(52) U.S. Cl.
CPC ............ *G06F 21/606* (2013.01); *H04L 69/08* (2013.01)

(58) Field of Classification Search
USPC ......................................................... 726/26
See application file for complete search history.

(56) References Cited

U.S. PATENT DOCUMENTS

| 7,012,893 B2 | 3/2006 | Bahadiroglu |
| 7,188,191 B1 * | 3/2007 | Hovell ................ H04L 12/4633 709/230 |
| 7,500,047 B1 | 3/2009 | Tyndall et al. |

(Continued)

FOREIGN PATENT DOCUMENTS

| CN | 101023420 A | 8/2007 |
| CN | 102687123 A | 9/2012 |

(Continued)

OTHER PUBLICATIONS

Globalplatform Technology, Virtual Primary Platform—Network Protocol Version 1.0.1, Document Reference GPC_FST_140, Oct. 2018, 74 pages (Year: 2018).*

(Continued)

*Primary Examiner* — Sanchit K Sarker
(74) *Attorney, Agent, or Firm* — Slater Matsil, LLP (57) ABSTRACT

The present description discloses a secure element and a communication method, configured to implement at least one first application, and including a circuit configured to record routing data and a list and parameters of communication protocols compatible with the first application, verify the compatibility of a first communication protocol used by first messages intended for the first application with the protocols of the list, convert the first messages into second messages by using a second communication protocol in response to the first protocol not being compatible with at least one of the protocols of the list, and direct the second messages to the first application by using the routing data of the first application.

21 Claims, 5 Drawing Sheets

(56) References Cited

U.S. PATENT DOCUMENTS

| | | |
|---|---|---|
| 9,088,433 B2 | 7/2015 | Roettgermann et al. |
| 9,338,059 B1 * | 5/2016 | Ainsworth .............. H04L 41/14 |
| 11,303,745 B2 | 4/2022 | Van Nieuwenhuyze |
| 2002/0194389 A1 | 12/2002 | Worley |
| 2006/0106941 A1 | 5/2006 | Pravin et al. |
| 2010/0274712 A1 | 10/2010 | Mestre' et al. |
| 2012/0042157 A1 | 2/2012 | Leclercq |
| 2012/0150601 A1 * | 6/2012 | Fisher ..................... H04B 5/70 705/14.23 |
| 2014/0020114 A1 | 1/2014 | Bhatia |
| 2016/0142109 A1 | 5/2016 | Kumar |
| 2016/0309285 A1 | 10/2016 | Charles |
| 2017/0329921 A1 * | 11/2017 | Willard ................. G16H 40/67 |
| 2018/0376333 A1 * | 12/2018 | Chen ...................... H04L 69/08 |
| 2019/0005284 A1 | 1/2019 | Hueber |
| 2019/0197267 A1 | 6/2019 | Stoilov et al. |
| 2020/0279059 A1 | 9/2020 | Courtiade et al. |

FOREIGN PATENT DOCUMENTS

| | | | | |
|---|---|---|---|---|
| CN | 104115175 A | * | 10/2014 | ............. G06Q 20/02 |
| CN | 104115175 a | * | 10/2014 | ............. G06Q 20/02 |
| CN | 106060759 A | | 10/2016 | |
| CN | 211509119 U | | 9/2020 | |
| FR | 3090947 A1 | | 6/2020 | |
| JP | 6517926 B2 | | 5/2019 | |

OTHER PUBLICATIONS

Global Platform Technology, "Virtual Primary Platform—Network Protocol Version 1.0.1", Document Reference GPC_FST_40, Oct. 2018, 74 pages (Year: 2018).*

Globalplatform Technology, "Virtual Primary Platform—Network Protocol Version 1.0.1", Document Reference GPC_FST_140, Oct. 2018, 74 pages.

* cited by examiner

//SECURE ELEMENT AND METHOD FOR MANAGING MESSAGE COMMUNICATION PROTOCOLS

CROSS-REFERENCE TO RELATED APPLICATIONS

This application claims the benefit of French Patent Application No. 2010973, filed on Oct. 27, 2020, which application is hereby incorporated herein by reference.

TECHNICAL FIELD

The present disclosure is related generally to electronic devices, and more particularly to electronic devices configured to process secret data. More particularly, the present disclosure is related to communication of a secure element with other electronic devices.

BACKGROUND

There exist more and more electronic devices adapted to providing digital services. These digital signals use cryptographic mechanisms where it is necessary to protect the secret data which have a high importance. The integrity of the content is also very important, indeed, conversely to a cipher (or signature) key, an identification number should not be able to be modified but it is freely accessible. For this purpose, it is up to electronic devices to guarantee the confidentiality and the integrity of the data.

A secure element is an electronic device, autonomous or not, adapted to processing secret data in secure fashion, that is, without for these secret data to be accessible or deduced, for example, by side channel attacks or penetration. A secure element may be configured to cipher data, for example.

It would be desirable to be able to improve, at least partly, certain aspects of the communication between a secure element and other electronic devices.

SUMMARY

There is a need for secure elements adapted to efficiently communicating with other electronic devices.

An embodiment overcomes all or part of the disadvantages of known secure elements.

An embodiment provides a secure element configured to implement at least one first application, and comprising a circuit configured to record routing data and a list and parameters of communication protocols compatible with the first application, verify the compatibility of a first communication protocol used by first messages intended for the first application with the protocols of the list, convert the first messages into second messages using a second communication protocol if the first protocol is not compatible with at least one of the protocols of the list, and direct the second messages to the first application by using the routing data of the first application.

An embodiment provides a method of communication between an electronic device and a secure element configured to implement at least one first application, the method comprising recording routing data and a list of communication protocols compatible with the first application, verifying the compatibility of a first communication protocol used by first messages intended for the first application with the protocols of the list, converting the first messages into second messages using a second communication protocol if the first protocol is not compatible with at least one of the protocols of the list, and directing the second messages to the first application by using the routing data of the first application.

According to an embodiment, the first protocols in the list are selected from the group comprising the VNP protocol defined by the standard, the HCI protocol, the SWP protocol, the CLT protocol, the packet communication protocol defined by the ISO7816 standard, the sHDLC protocol, and a communication protocol using an internal timing memory.

According to an embodiment, the secure element aggregates the data of the different applications to make a device with which it communicates believe that there is a single application combining the different recorded or active applications.

According to an embodiment, the secure element detects possible conflicts and implements a resolution mechanism during the recording or modifications of the protocols, parameters, or of the routing data by an application.

According to an embodiment, the second protocol is the VNP protocol.

According to an embodiment, the secure element or the communication method is configured to direct the first messages to the first application.

According to an embodiment, the secure element further comprises electronic components and low-level operating systems.

According to an embodiment, the first application is implemented by using the electronic components and the low-level operating systems.

According to an embodiment, the secure element is configured to implement at least one second application.

According to an embodiment, the first messages are directed to the first application even if the second application uses the same communication protocols as the first application.

According to an embodiment, the list of the routing data and of the communication protocols of the first application is erased or modified if the first application requests it.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
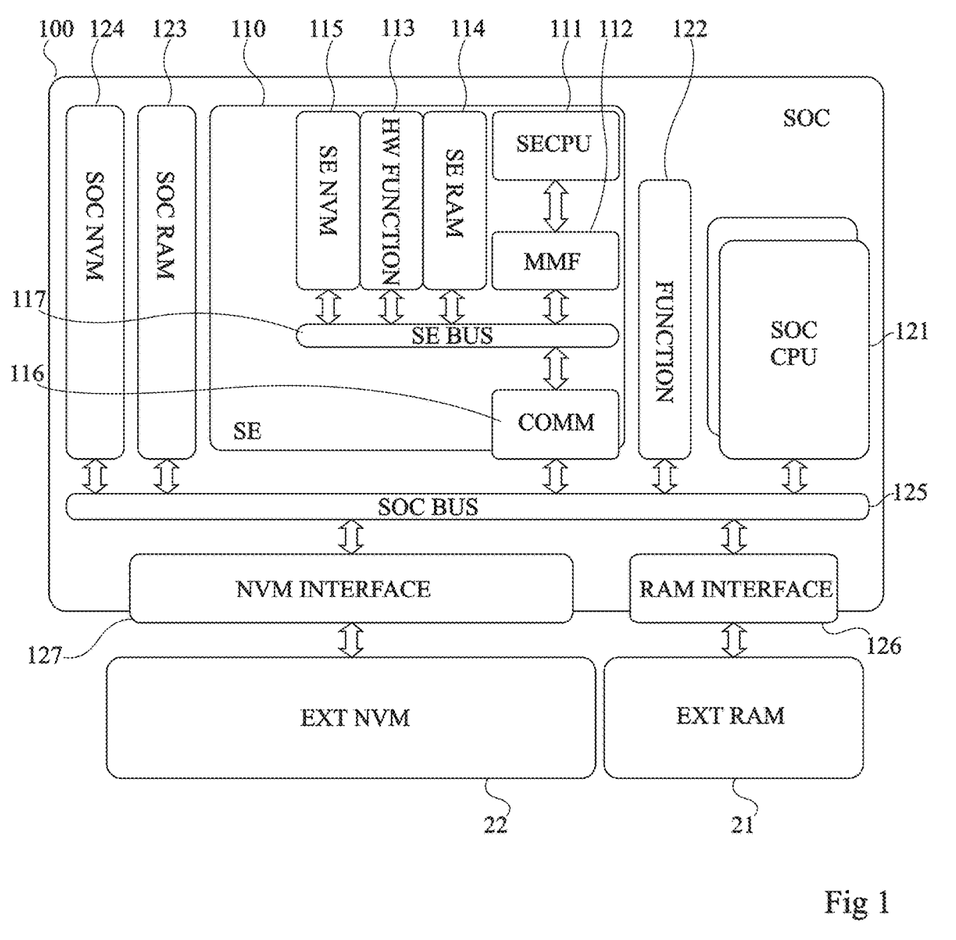
FIG. 1 schematically shows, in the form of blocks, an example of an electronic device of the type to which the described embodiments apply.

FIG. 1 schematically shows, in the form of blocks, an example of an electronic device 100 (SOC) of the type to which the described embodiments apply.

Device 100 is an electronic device formed on one and the same chip (System On Chip—SOC). Device 100 comprises a secure element no which, in this example, is integrated (iSE—integrated Secure Element). Secure element no is a secure element integrated in device 100, that is, which may have an autonomous operation in device 100. According to an alternative embodiment, secure element no uses certain hardware resources of device 100 to operate, such as memories, circuits implementing specific functionalities, etc.

Integrated secure element no is an electronic circuit manipulating secret data which are, for example, ciphered. Secure element no comprises at least one processor 111 (SE CPU) adapted to processing secret data; a memory management function 112 (MMF) and/or a memory management unit (MMU) (not shown), capable of managing the reading and the writing of data from and into the memories; one or a plurality of circuits 113 (HW FUNCTION) adapted to implementing hardware functionalities (for example, a cryptographic accelerator, a communication cell, etc.) of secure element 110; at least one volatile memory 114 (SE RAM);

at least one non-volatile memory 115 (SE NVM); a communication circuit 116 (COMM) adapted to managing transmissions of data and control signals between secure element no and the rest of device 100; and a communication bus 117 (SE BUS) coupling all the elements of secure element 110.

As a variant, integrated secure element no is connected to one or a plurality of additional communication buses. For example, the integrated secure element may have a bus according to the ISO7816 standard, connected with a modem of system-on-chip 100, another SWP-type (Single Wire Protocol) bus connected to a near-field communication device (NFC).

Processor 111 is used to process control signals and data originating from memories 114 and 115, or other memories comprised within device 100. Processor 111 uses memory management circuit 112 as an intermediary to manage the memory storage of the data and of the control signals, and thus the processor never directly has access to memories 114 and 115. As an example, circuit 112 may for example be used to allocate memory spaces of a volatile memory or of a non-volatile memory to certain applications implemented by the integrated secure element.

Circuits 113 may comprise a multitude of types of circuits and of components, functions enabling to copy data to external memories, cryptographic coprocessors, etc.

Communication circuit 116 may be used as a data receive and transmit chain for secure element 110. Circuit 116 may comprise data reception circuits, data ciphering and/or deciphering circuits, one or a plurality of routers, data conversion circuits. Device wo may comprise secure element 110 only, but may also further optionally comprise one or a plurality of processors 121 (SOC CPU) adapted to processing data; one or a plurality of circuits 122 (FUNCTION) adapted to implementing different functionalities of device 100; one or a plurality of volatile memories 123 (SOC RAM); one or a plurality of non-volatile memories 124 (SOC NVM); and a communication bus 125 (SOC BUS) enabling to exchange and to transmit control signals and data to all the previously-mentioned elements.

For bulk and compactness reasons, device wo may further be adapted to storing data into one or a plurality of external memories. More particularly, device 100 may be adapted to storing data into an external volatile memory 21 (EXT RAM) and/or into an external non-volatile memory 22 (EXT NVM). In this case, device 100 further comprises interface circuits adapted to communicating with the external memories. More particularly, device 100 may comprise, in this case, an interface circuit 126 (RAM INTERFACE) adapted to communicating with external volatile memory 21, and/or an interface circuit 127 (NVM INTERFACE) capable of communicating with non-volatile memory 22.

Secure element no may have access to the hardware resources of device 100 to operate, such as for example to circuits 122, to memories 123, 124, or even to memories 21 and 22.

Figure 2:
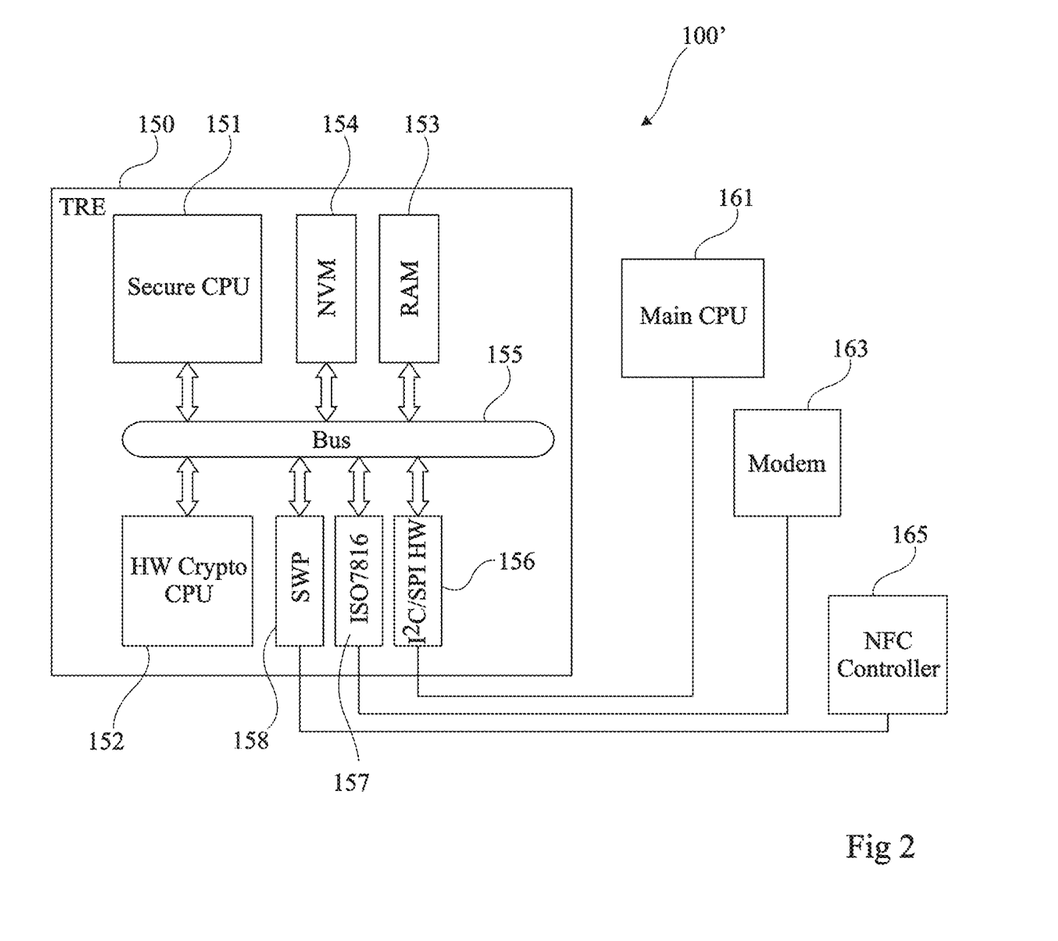
FIG. 2 schematically shows, in the form of blocks, another example of an electronic device of the type to which the described embodiments apply.

FIG. 2 schematically shows, in the form of blocks, another example of an electronic circuit 100' of the type to which the described embodiments apply.

Device 100' comprises various electronic circuits or chips among which an embedded Secure Element (eSE) 150 forming a tamper resistant element (TRE); a main processor 161 (Main CPU); a modem-type communication circuit 163 (Modem); and a near-field communication circuit 165 (NFC controller).

Embedded secure element 150 is formed of a single chip and integrates, for example, a secure element 151 (Secure CPU); a hardware cryptographic processor 152 (HW Crypto CPU) or cryptographic accelerator; one or a plurality of volatile memories 153 (RAM); one or a plurality of non-volatile memories 154 (NVM); and one or a plurality of buses 155 (Bus) of communication between the different components of element iso.

Element 150 further integrates interfaces of communication with the outside according to various communication protocols, for example, an interface 156 (I2C/SPI HW) of I2C or SPI type of communication with external processor 161; an interface 157 (ISO7816) of communication according to the ISO7816 standard with modem 163; and an SWP-type interface 158 (SWP) of communication with NFC controller 165.

Device 100' may comprise other circuits, integrated or not. For example, embedded secure element 150 may use one or a plurality of external memories (not shown) with which it communicates directly or via the main processor.

Conversely to an integrated secure element such as the element no of FIG. 1, an embedded secure element 150 is not integrated with the other components of device 100' and particularly the main processor of the application.

Embedded secure element 150 may however be integrated with a near-field communication controller (NFC).

Figure 3:
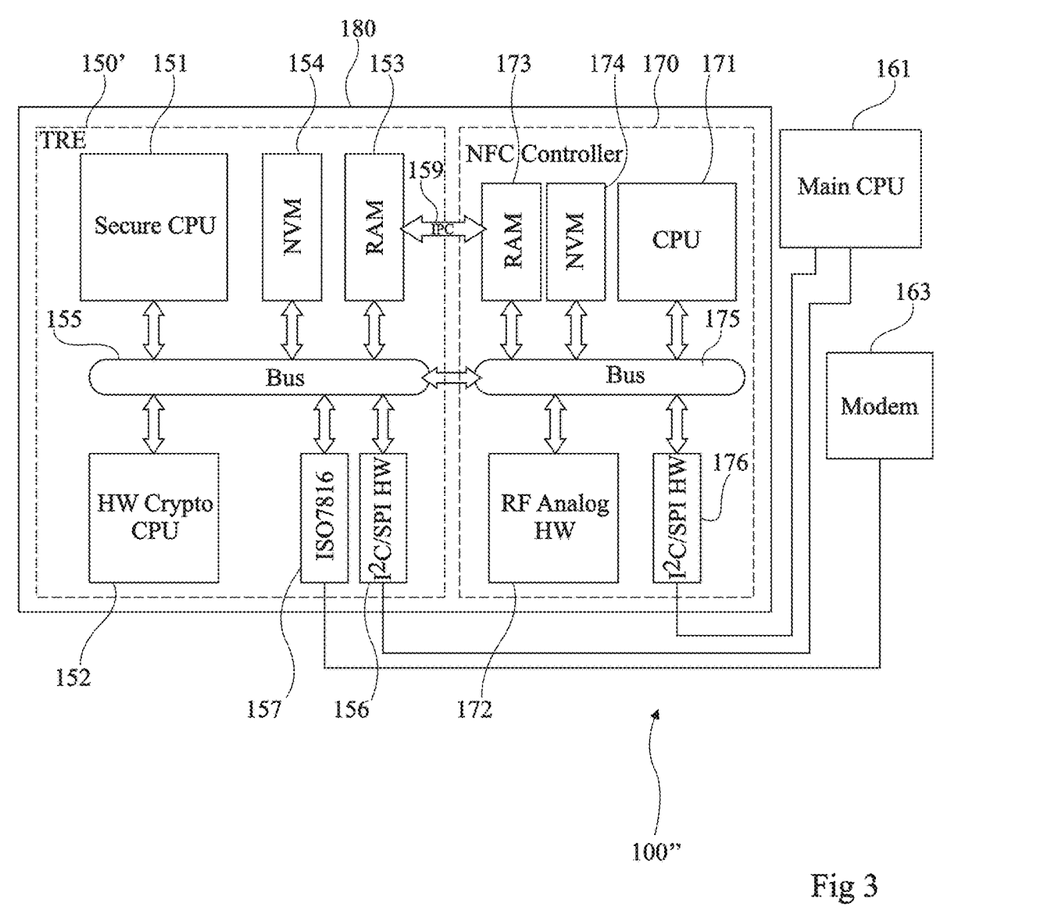
FIG. 3 schematically shows, in the form of blocks, still another example of an electronic device of the type to which the described embodiments apply.

FIG. 3 schematically shows, in the form of blocks, still another example of an electronic circuit 100" of the type to which the described embodiments apply.

In this example, it is assumed that the embedded secure element is integrated with a near-field communication controller on a same chip 180. Thus, integrated circuit or chip 18o comprises an embedded secure element 15o' (TRE) including the same elements as the element 150 of FIG. 2 except for interface 158, that is, a secure element 151 (Secure CPU); a hardware cryptographic processor 152 (HW Crypto CPU); one or a plurality of volatile memories 153 (RAM); one or a plurality of non-volatile memories 154 (NVM); one or a plurality of buses 155 (Bus) of communication between the different components of element 150; an interface 156 (I2C/SPI HW) of I2C or SPI type of communication with external processor 161 (Main CPU); and an interface 157 (ISO7816) of communication according to the ISO7816 standard with modem 163 (Modem); and a NFC controller 170 (NFC Controller) including, for example, a processor 171 (CPU); a radio frequency transmit/receive circuit 172 (RF Analog HW) or analog RF head; one or a plurality of volatile memories 173 (RAM); one or a plurality of non-volatile memories 174 (NVM); one or a plurality of buses 175 (Bus) of communication between the different components of the NFC controller; and an interface 176 (I2C/SPI HW) of communication with the main processor 161 of device 100".

The exchanges between secure element 150' and controller 170 directly transit through buses 155 and 175 which, according to cases, are coupled together and form one and the same bus, where element 150' and controller 170 may simulate a SWP protocol.

Secure element 150' and the controller may also communicate via their RAMs 153 and 173 via a shared memory 159 allowing the communication between processes (IPC—Inter-process Communication).

As a variant, secure element iso' and the controller may communicate via their internal SWP communication cells (not shown) (for example). This enables to keep the format of SWP exchanges (and of the protocols implemented thereon) without having the constraints (such as the noise, the bus speed limitation, etc.).

The application to near-field communications between a secure element (integrated or embedded) is a preferred application due to the strong development of these functionalities in the electronic devices.

Figure 4:
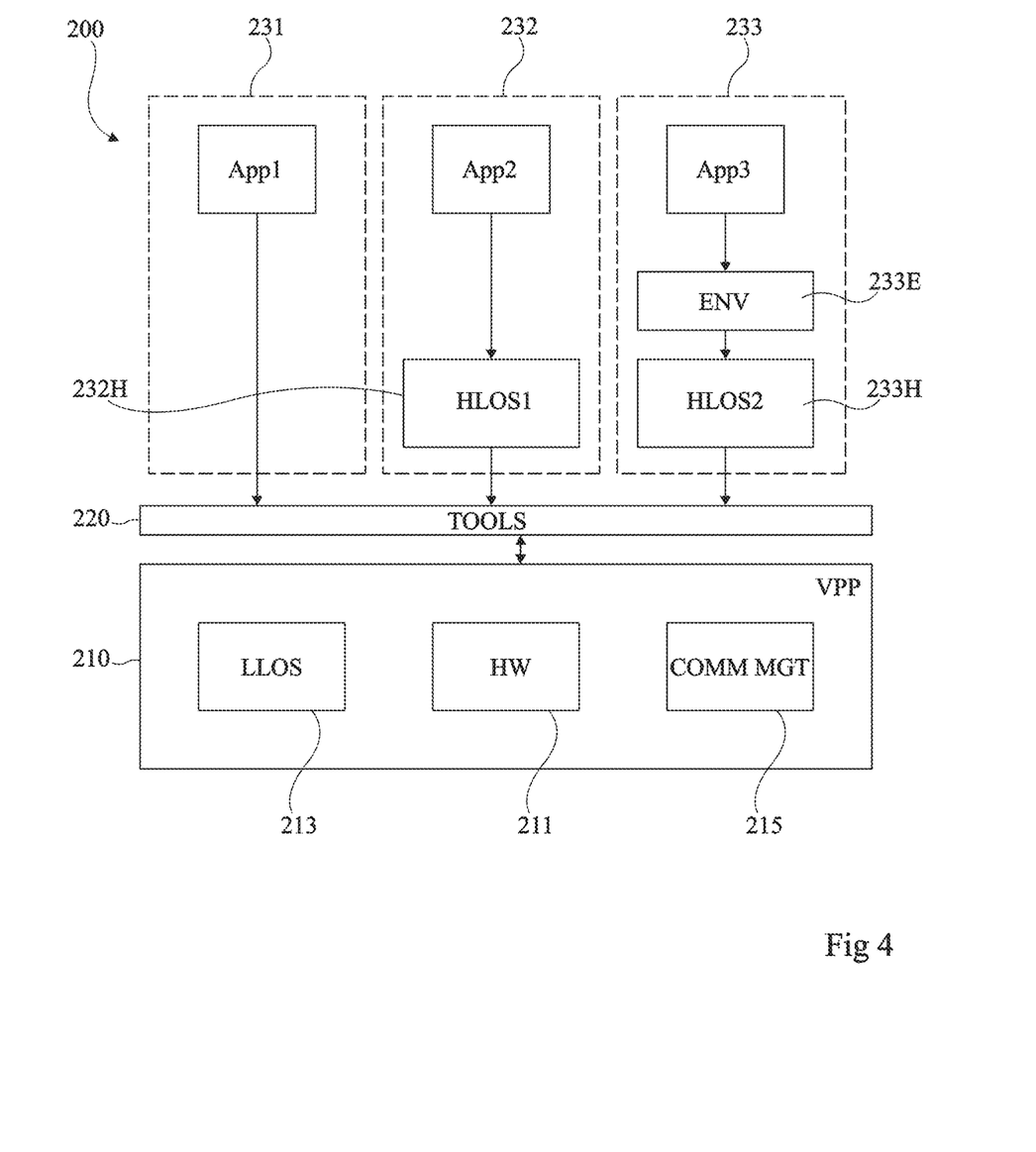
FIG. 4 schematically shows in the form of blocks an embodiment of a software architecture of a secure element of an electronic device of the type of those described in relation with FIGS. 1 to 3.

FIG. 4 schematically shows in the form of blocks an embodiment of a software architecture 200 of a secure element of an electronic device of the type of those described in relation with FIGS. 1 to 3.

Unless specified otherwise, the expression "secure element" designates hereafter indifferently an embedded secure element or an integrated secure element. Thus, the software architecture 200 of secure element SE may be implemented in any of the elements 110, 150, or 150' of the previous drawings.

Architecture 200 comprises a primary platform 210 (VPP), generally called virtual primary platform (VPP) comprising the access to the electronic components 211 (HW) of secure element SE and comprising one or a plurality of low-level operating systems 213 (LLOS). According to an embodiment, primary platform 210 further comprises a circuit capable of implementing a communication management software or process 215 (COMM MGT) having its operation described in relation with FIG. 5.

Components 211 are the hardware resources of secure element SE (110, FIG. 1; 150, FIG. 2; 150', FIG. 3). The components 211 of secure element no are for example one or a plurality of processors, for example, processor 111 (FIG. 1) or 151 (FIGS. 2 and 3), one or a plurality of memories, for example, memories 114 and 115 (FIG. 1) or 153 and 154 (FIGS. 2 and 3), one or a plurality of communication devices, such as a communication device enabling to directly communicate with a near-field communication device (NFC), a short-range communication device using, for example, the Bluetooth standard, biometric sensors, etc.

Low-level operating systems 213 are software adapted to implementing components 211 to execute control signals received from most of the applications implemented by the secure element. As an example, low-level operating systems 213 comprise all or part of the driver software of components 211.

A low-level operating system 213 is formed of an execution code (or executable code) and of execution data. The execution code contains instructions enabling to execute functions of the program. By definition, the instructions are invariable for a given program, except for an update of the program, which then modifies the instructions. The execution data are used by the execution code to contextualize the execution and perform the desired function. The execution data may be distributed in two categories. So-called "temporary" execution data and so-called "permanent" or "fixed" execution data. For example, if the function comprises the verification of a PIN code, this function is broken down into three portions, the execution code contains instructions of verification of the PIN code while the permanent execution data contain the reference PIN code and the number of remaining tests and the temporary execution data contain the PIN code submitted to the verification.

Primary platform 210 communicates with applications implemented by secure element 110 with interfaces or tools 220 (TOOLS) executed by the primary platform. These interfaces or tools 220 may comprise, among others, application binary interfaces (ABI); registers (VRE, Virtual Register); and storage buffer memories, or buffer memories, or also shared memories allowing a data exchange between processes via inter-process communications (IPC).

An application binary interface is a low-level interface between the applications of the secure element and its operating system, or between different portions of an application.

The registers are memory spaces linked to a hardware function of the secure element and used to temporarily store data, for example, when a control signal is sent to the primary platform 210 of the secure element or during exchanges between processes executed by the primary platform.

The buffer memories (or shared memories) are used to store messages before their use by platform 210 or by applications 231, 232, 233 of the secure element. In practice, buffer memories are memory spaces allocated in a memory of element 110, for example, a volatile memory to which element no has access, such as memory 114.

As an example, software architecture 200 comprises at least three applications 231, 232, 233 adapted to using interfaces or tools 220 to implement primary platform 210. Applications 231, 232, 233 are software using the resources of the primary platform. Of course, the secure element implements a number of applications within the limit of its calculation capacities.

An integrated secure element 110 (FIG. 1) could execute a single application at a time in its internal memories and record the other applications in external memories, which would enable to have a number of applications only limited by the external memories. The application must previously be loaded into the inner memories before being executed (or resuming the execution) and the previous application must be discharged before being able to use it. Conversely, an embedded secure element 150 (FIG. 2) or 150' (FIG. 3) will prefer the use of its internal memories to store and execute the applications, which implies a more limited notion of applications, but a faster execution since it will be spoken of an "in place" execution which does not require displacing the application. It however remains possible to combine an embedded secure element with external memories and thus to combine the benefit of the internal and external memories. Applications 231, 232, 233 may be adapted to implementing any type of functionalities. They generally implement digital services of a service provider, for example, a payment service of EMV or transport ticket type. These applications may be combined with another application located in main processor 121 (FIG. 1) or 161 (FIGS. 2 and 3) or in another secure environment (Trusted Execution Environment). The processor and the secure environment are better able to interact with the user via a trusted user interface. Applications 231, 232, 233 are for example adapted to processing control signals originating from communication interfaces, such as, for example, a bank transaction using a near-field communication device. The applications may be of different types, for example, a SIM (Subscriber Identity Module) application, a payment application, an application enabling to validate a public transport ticket, etc.

According to an example of application type, application 231 (App1) is capable of being directly implemented by primary platform 210 (VPP) by means of interfaces or tools 220. Application 231 is for example an application enabling to make payments by communicating with a near-field communication (NFC) device.

According to another example of application type, application 232 is a set of instructions 232A (App2) adapted to being executed by using a high-level operating system 232H (HLOS1). A high-level operating system is software adapted to implementing different applications by providing a set of common software functions. Operating system 232H is the only portion of application 232 to be communicating with primary platform 210 by means of interfaces or tools 220. As a variant, it can also be considered that the high-level operating system, as well as all the applications which are attached thereto, are a single application adapted to being implemented by primary platform 210 by means of interfaces or tools 220.

According to another example of application type, another application 233 is a set of instructions 233A (App3) using an execution environment 233E (ENV) which itself uses a high-level operating system 233H (HLOS2). The execution environment is for example of Java or JavaCard type. Operating system 233H and execution environment 233E are the only portions of application 233 to communicate with primary platform 210 by means of interfaces or tools 220. As a variant, it can also be considered that the high-level operating system, as well as all the applications which are attached thereto, are an application capable of being implemented by primary platform 210.

High-level operating systems 232H and 233H, or applications 232 and 233 themselves if there is no high-level operating system, use virtual images of the memories available for the management of the execution codes and of the execution data. Due to this technique, the high-level operating systems (or the applications) do not have a direct access to the management of physical memories, be they volatile or non-volatile. In other words, in the described embodiments, the high-level operating systems manage a virtual image of the memories. The correspondence of the physical distribution in the volatile and non-volatile memories is ensured by low-level operating system(s) 213 in combination with certain HW modules 211. More generally, it is considered that module 210 puts in correspondence the virtual and physical memories.

Further, it is considered that an application may be in at least three different states: an active state or state where it is run by primary platform 110; a standby state, that is, its execution is interrupted but it may be resumed at any moment; and an inactive or deactivated state, that is, its execution cannot be restarted without one or a plurality of prior operations.

When an application leaves the standby state to be executed again, it resumes its execution where it has stopped. It does not need using a specific routine to continue its processing. From the point of view of the application, all appears as if the application had not been interrupted.

When an application is deactivated, all its data are stored in the memory in the same way as for an application at standby.

The implementation of application 231, 232, or 233 is the following. When an application desires to use a hardware resource of the secure element, that is, one or a plurality of components 211 of primary platform 210, this means that the current operations executed on the fixed data are considered as ended. The application can then execute different control signals, for example, forcing a writing into a non-volatile memory. For this purpose, the application sends a control signal and/or data to primary platform 210 via interfaces or tools 220. The control signal is taken charge of by one or a plurality of application binary interfaces before being sent to low-level operating systems 213, that is, the control signal is divided into a plurality of operations, each represented by an application binary interface or virtual registers or also a buffer memory/shared memory. The data are stored into registers or transmitted via inter-process communications (IPC). Low-level operating systems 213 respond to the requests of the application binary interfaces by applying the operations requested by the application binary interfaces to the data stored in the registers. Low-level operating systems 213 then drive components 211 to execute what is requested by the application.

Applications 231, 232, 233 cannot communicate together within the secure element. Each application 23x (with x varying from 1 to the number of applications likely to be executed) does not know the existence of the other applications 23x. In particular, each operating system of an application "believes" that it is the only one to communicate with the outside. Thus, if the applications had to communicate together, they should do it as if they were discussing of a secure element executing an application 23x towards another element with an application 23x. However, two sub-applications of a same set or application 233 (an application may contain a plurality of sub-applications) use packet communication methods to communicate together by using the IPC inter-process communication tools. Each application 231, 232, 233 may communicate with external electronic devices. Packet communication is a data transmission method where sent messages are formed of one or of a plurality of data packets. Each data packet comprises a header comprising data relative to the type of communication protocol used, to the transmitter of the message, to the message receiver, to the message size, etc. Among the different known packet communication protocols, the secure element is likely to use (compatible with) different protocols that may be classified, according to the nature of the protocol, in terms of exchanged data protocol, of application protocol, of communication protocol, of physical link. For example, these protocols include the VNP protocol (Virtual Network Protocol) defined by the "GlobalPlatform Technology Virtual Primary Platform—Network Protocol 1.0.1" standard (or any subsequent version) which corresponds to a protocol of the exchanged data; the SWP protocol (Single Wire Protocol), defined by the ETSI TS 102 613 UICC—Contactless Front-end (CLF) Interface-Physical and data link layer characteristics standard, which corresponds to a physical link; the communication protocol defined by the ISO7816 standard which covers both the data exchange, the application protocol, the communications, and the nature of the physical link (wireless); the HCI (Host Controller Interface) protocol, defined by the ETSI TS 102 612 V12.0 standard (or any subsequent version) which corresponds to an application protocol; the CLT protocol, defined by the ETSI TS 102 613 UICC—Contactless Front-end (CLF) Interface-Physical and data link layer characteristics 11.0 standard (or any subsequent version), which corresponds to a communication protocol; the sHDLC protocol (Simplified High-Level Data Link Control), defined by the ETSI TS 102 613 (UICC—Contactless Front-end (CLF) Interface-Physical and data link layer characteristics) standard; and the I2C and SPI protocols which correspond to physical links.

The messages may also be transmitted via a memory playing the role of a communication bus. In other words, a communication bus may be replaced with a memory having the data to be transmitted by the transmit device written into it, and read by the receive device.

The VNP protocol is a communication protocol adapted to operating for the communications of a secure element. It is a protocol capable of managing the routing of the messages within architecture 200 and also towards outer devices. This is the preferred communication protocol in a secure element. According to an embodiment, the router comprised within components 211 (in combination with low-level operating systems 213) is a router configured to process messages using the VNP protocol.

The HCI, sHDLC, and CLT protocols are protocols which are in conflict with the VNP protocol, since these protocols are not compatible, the standards do not define the interaction between the two. The result of this conflict shows that the HCI, sHDLC, and CLT protocols are not adapted to managing the routing of the messages within architecture 200. Thus, the router comprised in components 211 cannot support a message using the sHDLC, CLT, and HCI protocols since the data for properly routing the messages within architecture 200 are not present.

The CLT, sHDLC, and HCI protocols, and the protocol defined by the ISO7816 standard are protocols which are not compatible with the use of the VNP protocol. The router comprised in components 211 (in combination with 213) is not capable of supporting a message using the CLT, sHDLC, HCI, and ISO7816 protocols.

In the embodiments described hereafter, it is desired to ascertain that the secure element (integrated or embedded) manages the possible conflicts between applications while isolating the applications from one another. In other words, each operating system of an application (or each application with no operating system) believes that it is the only one to access the secure element.

Figure 5:
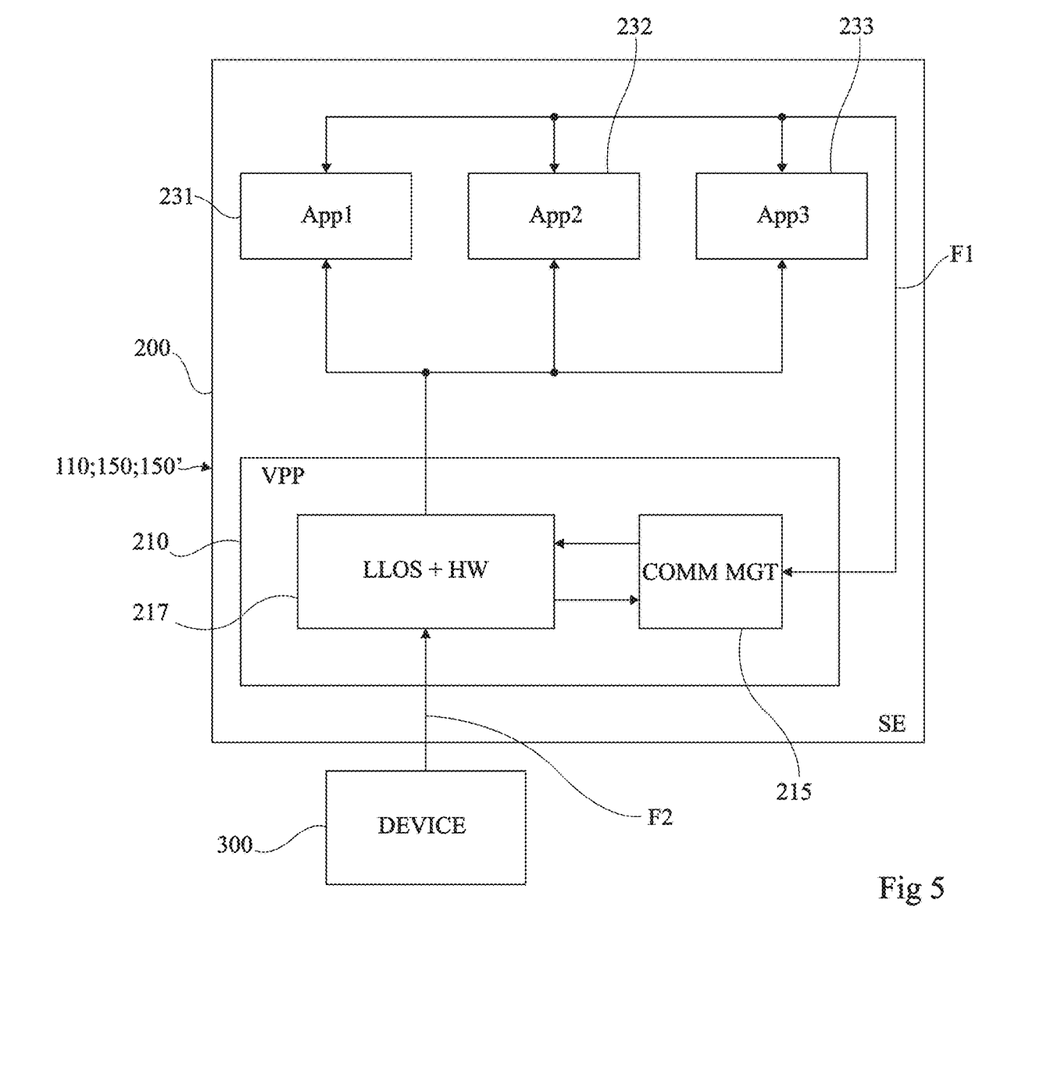
FIG. 5 schematically shows in the form of blocks an embodiment of a communication between two electronic devices.

An embodiment of a method of communication between secure element no and the outside clarifying the operation of the process or software 215 is described in relation with FIG. 5.

FIG. 5 schematically shows in the form of blocks an embodiment of a communication between two electronic devices.

More particularly, FIG. 5 schematically illustrates in the form of blocks a method of communication between a secure element SE no (FIG. 1)), 150 (FIG. 2), or 150' (FIG. 3) and an electronic device 300 (DEVICE).

Secure element SE is represented by a simplified form of its software architecture 200. The simplified form of its software architecture 200 comprises primary platform 210 (VPP) formed of a block 217 (LLOS+HW) representing the access to components 211 and low-level operating systems 213 and of block 215 (COMM MGT) representing the communication management process or software 215; and three applications 231 (App1), 232 (App2), and 233 (App3).

Electronic device 300 uses any packet communication protocol (for example, one of those described in relation with FIG. 4) to communicate with the secure element. Device 300 may be an electronic device external to device 100 (FIG. 1), 100' (FIG. 2), 100" (FIG. 3) where the secure element is comprised, or may be an internal element of device 100 (FIG. 1), 100' (FIG. 2), 100" (FIG. 3), distinct from secure element no. According to a specific embodiment, device 300 is a near-field communication device 170 (FIG. 3) comprised in device 100" and adapted to receiving communications from electronic devices external to device 100".

In a first initialization step, symbolized by an arrow F1 in FIG. 3, applications 231, 232, and 233 register with software 215. During the registration of an application with software 215, the application sends to software 215 the list of the communication protocols that it is capable of using (with which it is compatible), the parameters necessary to use the protocols, and also supplies software 215 with the routing data concerning it. In other words, the routing data and a list of compatible communication protocols and the parameters associated with the protocols are recorded with the first application.

Software 215 is adapted to making a message using a first communication protocol compatible with the communication protocol used by secure element SE. According to an embodiment, the secure element uses as a priority the VNP communication protocol defined in relation with FIG. 4. In other words, secure element SE comprises, among its components 211 (FIG. 4), at least one router configured to use the VNP communication protocol and adapted to processing messages using this protocol by directing them to their destination, such as for example application 231, 232, or 233. Thus, software 215 is adapted to converting messages using the SWP protocol, the sHDLC protocol, or the communication protocol defined by the ISO7816 standard into messages using the VNP protocol, for example by modifying the headers of the packets forming the message. Further software 215, knowing the routing data concerning the applications, is further adapted to processing messages using the HCI protocol or the CLT protocol. As previously indicated, the HCI and CLT protocols are compatible with the VNP protocol but are not adapted to managing the routing of the messages. When a message using the HCI protocol or the CLT protocol is received by secure element SE, software 215 is adapted to directing the message to the application using this communication protocol. Software 215 (in combination with block 217) provides an advantage for device

300. Indeed, device 300 is not capable of using the VNP protocol and uses its own protocol (SWP, sHDLC, ISO7816, etc.). An advantage of this solution is that software 215 (in combination with 217) may make believe that there exists a single application (231, 232, 233) from the point of view of device 300. Indeed, due to the data provided during the registration of an application, device 300 is capable of combining the data to aggregate them and make believe that there is a single application but which combines all the "functionalities" of the active/registered applications (231, 232, 233). When a message originates from device 300, due to the routing data, software layer 215 (in combination with 217) is capable of routing the message to the targeted application (while converting the protocol if need be as previously indicated).

An example of communication between device 300 and the secure element is the following. Device 300 sends a message intended for an application of the secure element, for example, application 231. This message is first received by the components and the low-level operating systems 217 of primary platform 210. More particularly, the message is received by the router comprised in the components of secure element SE. If the message uses a communication protocol different from the VNP protocol, the message is sent to software 215 to be processed. According to an alternative embodiment, all messages may be sent to software 215 to be processed. If the message uses a communication protocol compatible with the VNP protocol, that is, the HCI protocol or the CLT protocol, the software uses the routing data of applications 231, 232, and 233 to direct the message to application 231. If the message uses a communication protocol which is not compatible with the VNP protocol, software 215 converts the message so that it uses the VNP protocol. For this purpose, it modifies the header of the packets forming the message, and uses the routing data of applications 231, 232, and 233 to direct the message to application 231.

According to an embodiment, process or software 215 is further adapted to managing conflicts between a plurality of applications. More particularly, it may happen that a plurality of applications use the same communication protocol or parameters that might be conflicting on a same protocol. During their registration, each application would provide the list of protocols, of parameters, and of routing data that it needs. If these data are incompatible with the already-existing parameters, the recording (or the modification) of these parameters by the application would be denied. Software 215 (in combination with 217) might also provide a mechanism to manage conflicts, for example, by mentioning which application causes the conflict so that it is solved (by the use, for example, which would deactivate the conflicting application and would allow the registration/modification of this new application). Software 215 (in combination with 217) is adapted to delivering the received messages to the right application, particularly due to the routing data supplied by the application.

According to an embodiment, software 215 is further adapted to erasing the data relative to an application, that is, the list of the communication protocols that it uses and its routing data, on request by the application. As an example, an application may request to de-register each time it switches to an inactive state.

Various embodiments and variants have been described. Those skilled in the art will understand that certain features of these various embodiments and variants may be combined, and other variants will occur to those skilled in the art.

Finally, the practical implementation of the described embodiments and variations is within the abilities of those skilled in the art based on the functional indications given hereinabove.

What is claimed is:

1. A secure element configured to implement at least one first application, the secure element comprising:
   a circuit, of the secure element, configured to:
      record routing data, and a list and parameters of communication protocols compatible with the first application of the secure element;
      verify a compatibility of a first communication protocol used by first messages intended for the first application of the secure element with the communication protocols of the list;
      convert the first messages into second messages using a second communication protocol of the secure element in response to the first communication protocol not being compatible with any of the communication protocols of the list, the conversion including modification, in the second messages, of routing information of the first application of the secure element targeted by the first messages; and
      direct the second messages to the first application of the secure element by using the routing data of the first application of the secure element;
   wherein the secure element is configured to aggregate data of different applications to make a device with which the secure element communicates view the different applications as a single application.

2. The secure element according to claim 1, wherein each communication protocol in the list is selected from the group consisting of: a virtual network protocol (VNP) defined according to a Global Platform Technology—Virtual Primary Platform—Network Protocol 1.0.1 or subsequent version, a Host Controller Interface (HCI) protocol, a Single Wire Protocol (SWP) protocol, a Contactless Tunneling (CLT) protocol, a packet communication protocol defined by an International Organization for Standardization 7816 (ISO7816) standard, a simplified High-Level Data Link Control (sHDLC) protocol, or a communication protocol using an internal timing memory.

3. The secure element according to claim 1, wherein each of the different applications is recorded or active.

4. The secure element according to claim 1, wherein the secure element is configured to detect potential conflicts and implement a resolution mechanism during the recording or modifying of the communication protocols, the parameters, or the routing data of an application.

5. The secure element according to claim 4, wherein the second communication protocol is a VNP protocol defined according to a Global Platform Technology—Virtual Primary Platform—Network Protocol 1.0.1 or subsequent standard.

6. The secure element according to claim 1, wherein the secure element is configured to direct the first messages to the first application.

7. The secure element according to claim 1, wherein the secure element further comprises electronic components and low-level operating systems.

8. The secure element according to claim 7, wherein the first application is implemented using the electronic components and the low-level operating systems.

9. The secure element according to claim 1, wherein the secure element is configured to implement at least one second application.

10. The secure element according to claim 9, wherein the first messages are directed to the first application irrespective of whether the second application uses the same communication protocols as the first application.

11. The secure element according to claim 1, wherein the list of the routing data and the communication protocols of the first application is erased or modified in response to a request by the first application.

12. A method of communicating with an electronic device by a secure element configured to implement at least a first application, the method comprising:
   recording, by the secure element, routing data, and a list and parameters of communication protocols compatible with the first application of the secure element;
   verifying, by the secure element, a compatibility of a first communication protocol used by first messages intended for the first application of the secure element with the communication protocols of the list;
   converting, by the secure element, the first messages into second messages using a second communication protocol of the secure element in response to the first communication protocol not being compatible with any of the communication protocols of the list, the converting including modifying, in the second messages, routing information of the first application of the secure element targeted by the first messages;
   directing, by the secure element, the second messages to the first application of the secure element by using the routing data of the first application of the secure element; and
   aggregating, by the secure element, data of different applications to make a device with which the secure element communicates view the different applications as a single application.

13. The method according to claim 12, wherein each communication protocol in the list is selected from the group consisting of: a virtual network protocol (VNP) defined according to a Global Platform Technology—Virtual Primary Platform—Network Protocol 1.0.1 or subsequent version, a Host Controller Interface (HCI) protocol, a Single Wire Protocol (SWP) protocol, a Contactless Tunneling (CLT) protocol, a packet communication protocol defined by an International Organization for Standardization 7816 (ISO7816) standard, a simplified High-Level Data Link Control (sHDLC) protocol, or a communication protocol using an internal timing memory.

14. The method according to claim 12, wherein each of the different applications is recorded or active.

15. The method according to claim 12, further comprising:
   detecting, by the secure element, potential conflicts; and
   implementing, by the secure element, a resolution mechanism during the recording or modifying of the communication protocols, the parameters, or the routing data of an application.

16. The method according to claim 15, wherein the second communication protocol is a VNP protocol defined according to a Global Platform Technology—Virtual Primary Platform—Network Protocol 1.0.1 or subsequent standard.

17. The method according to claim 12, further comprising directing, by the secure element, the first messages to the first application.

18. The method according to claim 12, wherein the method further comprises implementing the first application using electronic components and low-level operating systems of the secure element.

19. The method according to claim 12, further comprising implementing, by the secure element, at least one second application.

20. The method according to claim 19, further comprising directing the first messages to the first application irrespective of whether the second application uses the same communication protocols as the first application.

21. The method according to claim 12, further comprising erasing or modifying the list of the routing data and the communication protocols of the first application in response to a request by the first application.

* * * * *